United States Patent [19]
Ortel

[11] Patent Number: 6,157,716
[45] Date of Patent: Dec. 5, 2000

[54] POWER FEED CIRCUIT PROVIDING BOTH ON-HOOK AND OFF-HOOK POWER FOR TELEPHONE SUBSCRIBER LOOP

[75] Inventor: William C. G. Ortel, New York, N.Y.

[73] Assignee: Bell Atlantic Corporation, White Plains, N.Y.

[21] Appl. No.: 09/075,094

[22] Filed: May 8, 1998

[51] Int. Cl.[7] .................................................. H04M 11/00
[52] U.S. Cl. .......................................... 379/413; 379/399
[58] Field of Search ................................. 379/413, 322, 379/323, 324, 399

[56] References Cited

U.S. PATENT DOCUMENTS

| | | | |
|---|---|---|---|
| 4,419,542 | 12/1983 | Embree et al. | 179/77 |
| 4,511,763 | 4/1985 | Skidanenko et al. | 179/16 AA |
| 4,554,412 | 11/1985 | Smith | 179/78 R |
| 4,558,272 | 12/1985 | Grosch | 323/315 |
| 4,588,860 | 5/1986 | Ayano et al. | 179/77 |
| 5,138,658 | 8/1992 | Carter et al. | 379/413 |
| 5,263,021 | 11/1993 | Ortel | 370/74 |
| 5,333,196 | 7/1994 | Jakab | 379/413 |
| 5,351,234 | 9/1994 | Beierle et al. | 370/49.5 |
| 5,469,282 | 11/1995 | Ishioka | 379/413 |
| 5,721,774 | 2/1998 | Stiefel | 379/413 |
| 5,737,411 | 4/1998 | Apfel et al. | 379/413 |
| 5,754,644 | 5/1998 | Akhteruzzaman | 379/413 |

*Primary Examiner*—Stella Woo
*Attorney, Agent, or Firm*—Robin, Blecker & Daley

[57] ABSTRACT

A power feed circuit provides power for a telephone subscriber loop connected to a unit of terminal equipment. The power feed circuit includes a first current supply circuit for supplying power to the subscriber loop when the unit of terminal equipment is in an on-hook condition and when the unit of terminal equipment is in an off-hook condition, and a second current supply circuit for supplying power to the subscriber loop only when the unit of terminal equipment is in the off-hook condition. Each current supply circuit includes a respective battery, transistor and bias network. The first current supply circuit is connected to the subscriber loop via a diode which is reverse-biased when the unit of terminal equipment is in the on-hook condition. The power feed circuit may be usefully applied in an Optical Network Unit (ONU) of a "fiber-in-the-loop" telephone system or in a Subscriber-Cable Interface Unit (SCIU) of a cable telephony system.

13 Claims, 9 Drawing Sheets

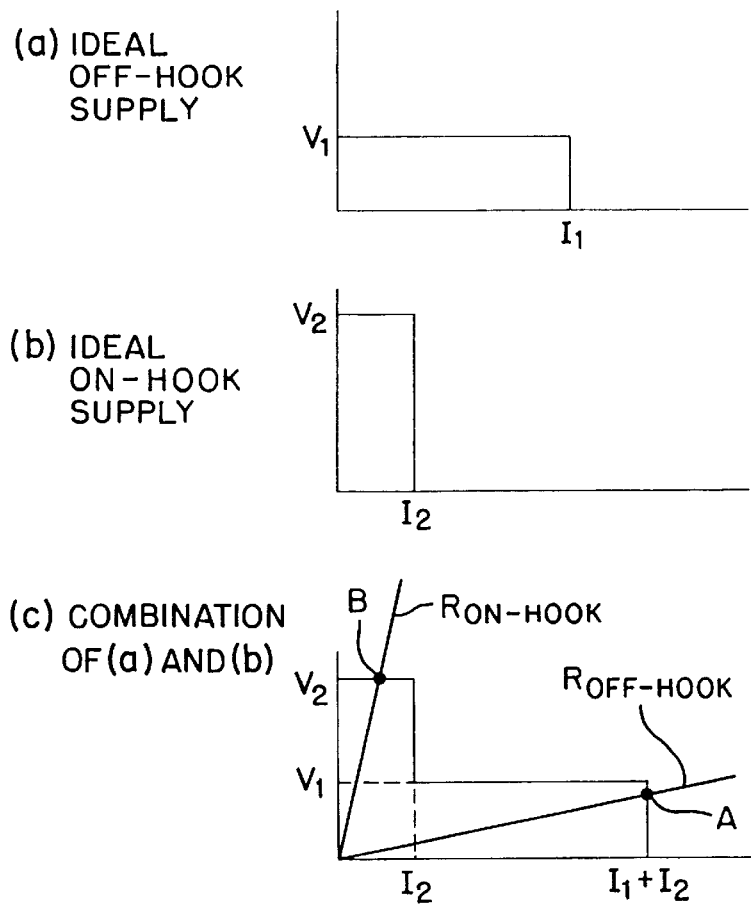
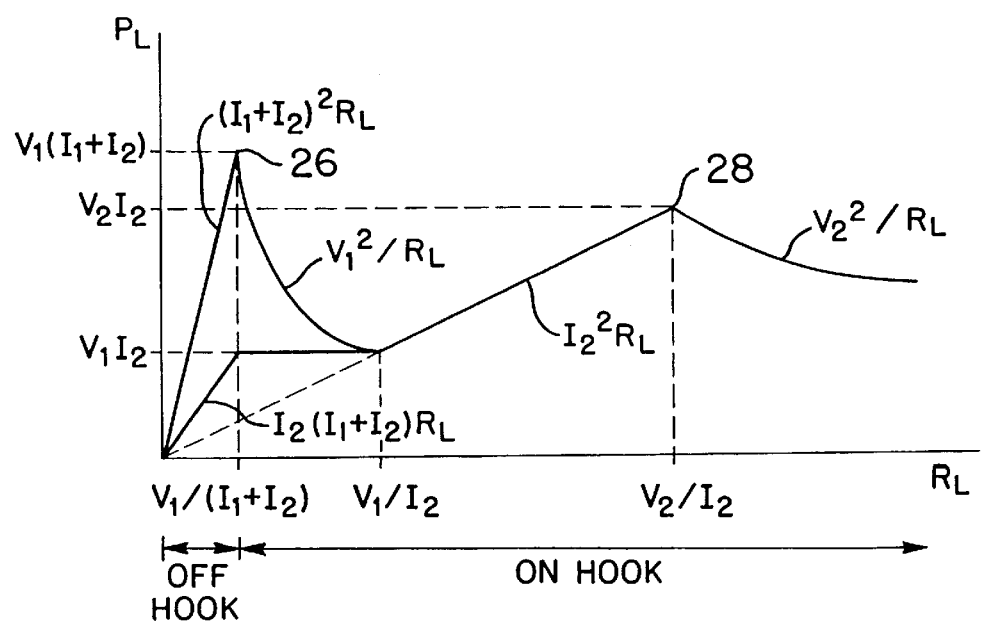

POWER FEED CIRCUIT PROVIDING BOTH ON-HOOK AND OFF-HOOK POWER FOR TELEPHONE SUBSCRIBER LOOP

BACKGROUND OF THE INVENTION

This invention is concerned with circuitry for providing a local loop connection between a telephone central office and a subscriber's premises, and is more particularly concerned with power feed circuitry for the subscriber loop.

It has been proposed to implement a portion of the signal path between the central office and subscriber premises in the form of optical fibers. In such systems, known as "fiber-in-the-loop" (FITL) systems, an Optical Network Unit (ONU) is connected between the subscriber side of the optical fiber and the metal wire pair which completes the loop to the subscriber premises.

It has also been proposed to combine distribution of telephone signals with video signals in a broad-band coaxial cable network. An example of such a so-called cable telephony system is described in U.S. Pat. No. 5,351,234, which has a common inventor with the present application. (The disclosure of the '234 patent is incorporated herein by reference.) In a cable telephony system, a Subscriber-Cable Interface Unit (SCIU) is installed between the coaxial cable and the metal wire pair which completes the subscriber loop.

It is customary to include in the ONU of an FITL system, or in the SCIU of a cable telephony system, a power feed circuit which provides at least some of the power required for the terminal equipment installed at the customer premises. FIG. 1 schematically illustrates such a power feed circuit.

As seen from FIG. 1, the power feed circuit includes a power supply S which is connected to a telephone 20 or other terminal equipment installed at the customer premises through a loop interface unit 22 and a tip and ring wire pair 24 which constitutes the loop connection between the interface unit 22 and the telephone 20.

The loop interface unit provides voice band transmission, ringing, and other associated functions, including determining whether the telephone 20 is in an on-hook or off-hook condition by monitoring the loop current, $I_L$. The power supply S typically contains a battery or constant-voltage source, which is connected in parallel to serve the respective loops of a number of different subscribers (although only one such loop is shown in FIG. 1). The power supply S also includes a current-limiting resistor for each loop.

According to applicable standards promulgated by Bellcore or ANSI, the loop voltage $V_L$ to be provided by the power feed circuit should be no less than 9 V when the customer premise equipment is in an off-hook condition, and no less than 21 V when the customer premise equipment is in an on-hook condition. The current to be provided for the off-hook condition must be no less than 20 mA, assuming that the loop and customer premise equipment meet the requirement that the off-hook resistance is no greater than 450Ω. For the on-hook condition the resistance must be at least 5MΩ, so that the requirement for on-hook loop current is only 4.2 μA.

The cost of providing loop power is an important element in the overall cost of the FITL or cable telephony system, and it would therefore be desirable to achieve greater efficiency than that found in conventional battery plus resistor power feed circuits. It is also believed that a power feed circuit capable of supplying substantially more than the minimum power required for the on-hook condition may provide significant advantages. For example, a "loop reconnection device" disclosed in U.S. Pat. No. 5,764,754 (application Ser. No. 08/362,613, filed Dec. 22, 1994, and having a common inventor with this application) might require substantially more power than that provided for in the existing advisory standard for on-hook power. The disclosure of the '613 patent application is incorporated herein by reference.

It is therefore a primary object of the invention to provide an improvement in subscriber loop power feed circuits of the type employed in fiber-in-the-loop and cable telephony systems.

It is an additional object of the invention to reduce the power dissipation and cost of a telephone subscriber loop system in which a specified amount of DC power is required to be supplied to the subscriber equipment when it is in an on-hook condition.

It is a further object of the invention to provide a power feed circuit which is capable of substantially exceeding the recommended criteria for providing on-hook power without adversely affecting off-hook power dissipation.

SUMMARY OF THE INVENTION

In accordance with the principles of the present invention, the above and other objects are realized by provision of a power feed circuit for a telephone subscriber loop which is connected to a unit of terminal equipment, the unit of terminal equipment being switchable between an on-hook condition and an off-hook condition, the power feed circuit including a first current supply circuit for supplying power to the subscriber loop when the unit of terminal equipment is in the on-hook condition and when the unit of terminal equipment is in the off-hook condition, and a second current supply circuit which supplies power to the subscriber loop only when the unit of terminal equipment is in the off-hook condition. Preferably the first and second current supply circuits are connected in parallel to the subscriber loop and each includes a respective battery and a respective resistor-transistor network. Also, it is preferred that the second current supply circuit be connected to the subscriber loop via a diode which is reverse-biased when the unit of terminal equipment is in its on-hook condition.

BRIEF DESCRIPTION OF THE DRAWINGS

The above and other features, advantages and aspects of the present invention will become more apparent upon reading the following detailed description in conjunction with the accompanying drawings, in which:

FIG. 3 shows ideal current source characteristics for the power feed circuit of FIG. 2;

FIG. 4 graphically illustrates the amount of power supplied by the circuit of FIG. 2, as a function of the loop resistance;

DETAILED DESCRIPTION

Figure 1:
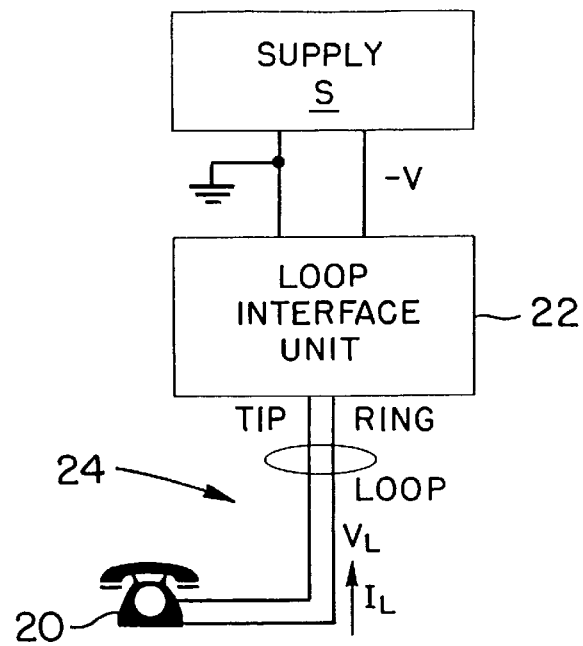
FIG. 1 schematically illustrates a conventional subscriber loop power feed circuit.
Figure 2:
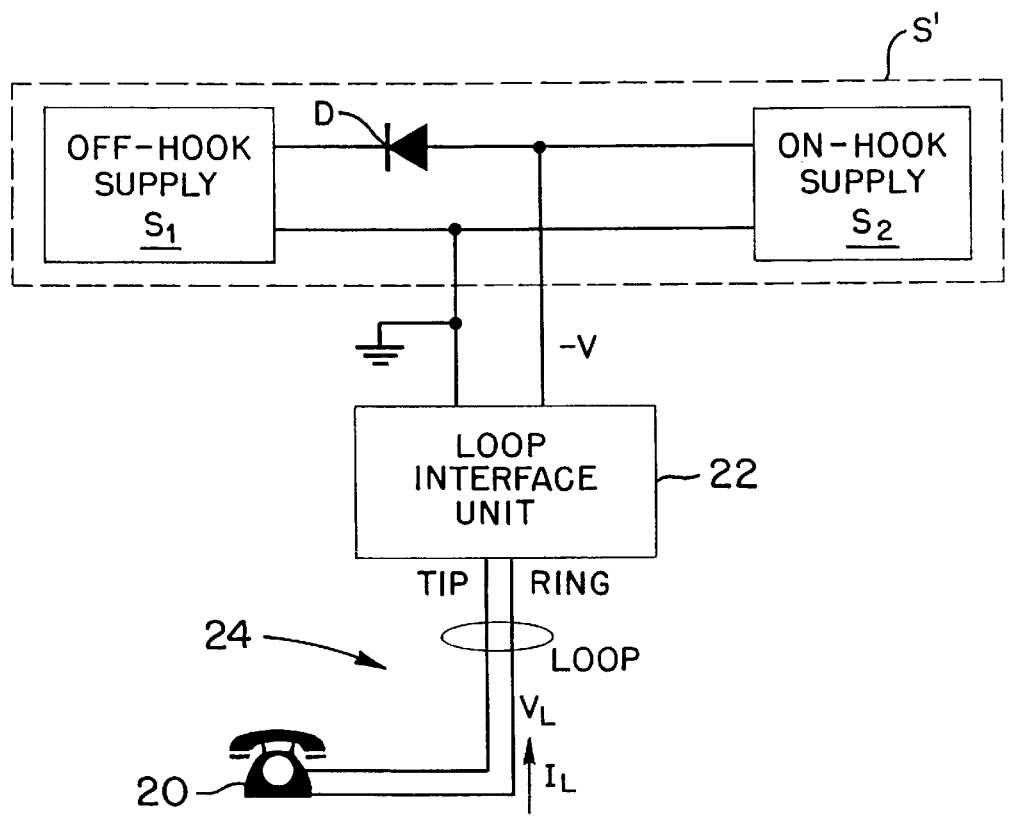
FIG. 2 is a schematic block illustration of a subscriber loop power feed circuit provided in accordance with the invention.

FIG. 2 shows a power feed circuit in accordance with the present invention, in which the conventional power supply S of FIG. 1 is replaced with an improved power supply S'. The power supply S' includes an off-hook supply $S_1$ and an on-hook supply $S_2$ which are connected in parallel to the subscriber loop 24 via the conventional loop interface unit 22. The off-hook supply $S_1$ is connected to the subscriber loop through a diode D which is reverse-biased when the telephone 20 is in the on-hook condition, so that essentially all power for the loop is derived from the on-hook supply $S_2$ at that time. When the telephone 20 is off-hook, substantial power is also derived from the off-hook supply $S_1$, in addition to power supplied from the on-hook supply $S_2$. In other words, the on-hook supply always provides power for the subscriber loop, whereas the off-hook supply provides substantial power only when the telephone 20 is in its off-hook condition.

If the power supplies $S_1$ and $S_2$ were ideal circuits, each would have the current-voltage characteristic of a constant-current source, as shown, respectively, in FIGS. 3A and 3B. Consequently, the supplies $S_1$ and $S_2$ would be able, respectively, to deliver maximum power levels $V_1 \cdot I_1$ and $V_2 \cdot I_2$, to loads $V_1/I_1$ and $V_2/I_2$. These characteristics are ideal in the sense that the supplies $S_1$ and $S_2$ need not be designed to handle more power than the above maximum; if the load were a short circuit, the amounts of power dissipated by supplies $S_1$ and $S_2$ would still be, respectively, $V_1 \cdot I_1$ and $V_2 \cdot I_2$.

If an ideal diode were part of the circuit along with ideal supplies, the resulting current-voltage characteristic at the subscriber loop would be as shown in FIG. 3(*c*). For values of the loop voltage $V_L$ between zero and $V_1$, the diode D is forward-biased, with zero voltage drop, and the resulting current is the sum of the characteristic curves for supplies $S_1$ and $S_2$. For values of $V_L$ greater in magnitude than (i.e., more negative than) $V_1$, the diode D is reverse-biased, with zero contribution to the resulting current. In this voltage range, the resulting loop current $I_L$ is simply the current provided by supply $S_2$.

FIG. 3(*c*) also shows typical off-hook and on-hook operating points A and B which are points where the characteristic of the combined supply intersects, respectively, with load lines having slopes corresponding to the off-hook and on-hook values of the loop resistance $V_L/I_L$.

According to the standards referred to above, the voltage $V_1$ provided for the off-hook condition should be at least 9.0 V, and the voltage $V_2$ for the on-hook condition should be at least 21 V. Further, the sum $I_1+I_2$ should be not less than 20 mA. The on-hook current level $I_2$ may be chosen to meet a desired on-hook power level in excess of that required for the standard current requirement of 4.2 $\mu$A. With the circuit design described herein, $I_2$ can be much larger than 4.2 $\mu$A.

For the ideal model of FIG. 3(*c*), FIG. 4 shows how the power delivered to the loop, $P_L=V_L I_L$, depends in general upon the loop resistance, $R_L=V_L/I_L$. For small values of $R_L$ constituting the off-hook region, the circuit delivers a constant current and hence a power that is proportional to $R_L$, up to a peak at $R_L=V_1/(I_1+I_2)$. In this region, the power delivered to the loop is derived from both supplies $S_1$ and $S_2$, in the proportions $I_1/(I_1+I_2)$ and $I_2/(I_1+I_2)$ respectively. For larger values of $R_L$, there is a region between $R_L=V_1/(I_1+I_2)$ and $R_L=V_1/I_2$ in which the power delivered to the loop is still derived from both supplies $S_1$ and $S_2$, but the power from supply $S_2$ remains constant at $V_1 I_2$ while that from supply $S_1$ is given by $(V_1^2/R_L)-V_1 I_2$. This region ends when diode D becomes back-biased. Beyond that point, there is no power coming from supply $S_1$. Here, the power from supply $S_2$ is given by $I_2^2 R_L$ up to another peak at $R_L=V_2/I_2$. For still higher values of $R_L$, the loop power (still all derived from supply $S_2$) is $V_2^2/R_L$. This is the region in which the loop voltage meets the off-hook minimum requirement.

The peaks are at end points of ranges of values of $R_L$ for which the requirements for off-hook current and for on-hook voltage are met. For values of $R_L$ between these limits, the loop will be off-hook as judged by the current detector (not shown) in the loop interface unit 22, but the loop voltage will be intermediate between $V_1$ and $V_2$. The power feed circuit should be designed so that this intermediate range of values of $R_L$ does not include any values that are expected in actual applications. This can readily be achieved for an ONU or SCIU, since an ONU or SCIU is only required to serve a relatively short loop.

The on-hook peak power may be greater or less than the off-hook peak. The ratio is $(V_2/V_1)/(1+I_1/I_2)$, which reaches its greatest value when $I_2=I_1+I_2$, or $I_1=0$. In this limiting case only $S_2$ is operative.

One possible design would provide for equal amounts of on-hook and off-hook power. This requires $I_2=(V_1/V_2)(I_1+I_2)$.

For the typical values given above, the peak amounts of loop power will be equal, at 180 mW, for $I_2$=8 4/7 mA. The "forbidden" range of values of $R_L$ between the peaks is then from 450$\Omega$ to 2,450$\Omega$.

The amount of on-hook power that is required may well be less than the off-hook power. As may be seen from FIG. 4, when $I_1+I_2$, $V_1$, and $V_2$ are fixed, the value of $R_L$ at the on-hook peak 28 is inversely proportional to $I_2$ and hence to the magnitude of the on-hook peak power. For example, for the peak to occur at the ANSI-specified value of 5M$\Omega$ requires $I_2$=4.2 $\mu$A, for an on-hook peak of 88.2 $\mu$W. An actual circuit design presented below provides substantially more on-hook power, 42 mW, supplying $I_2$=2 mA at $R_L$=10, 500$\Omega$.

Figure 5:
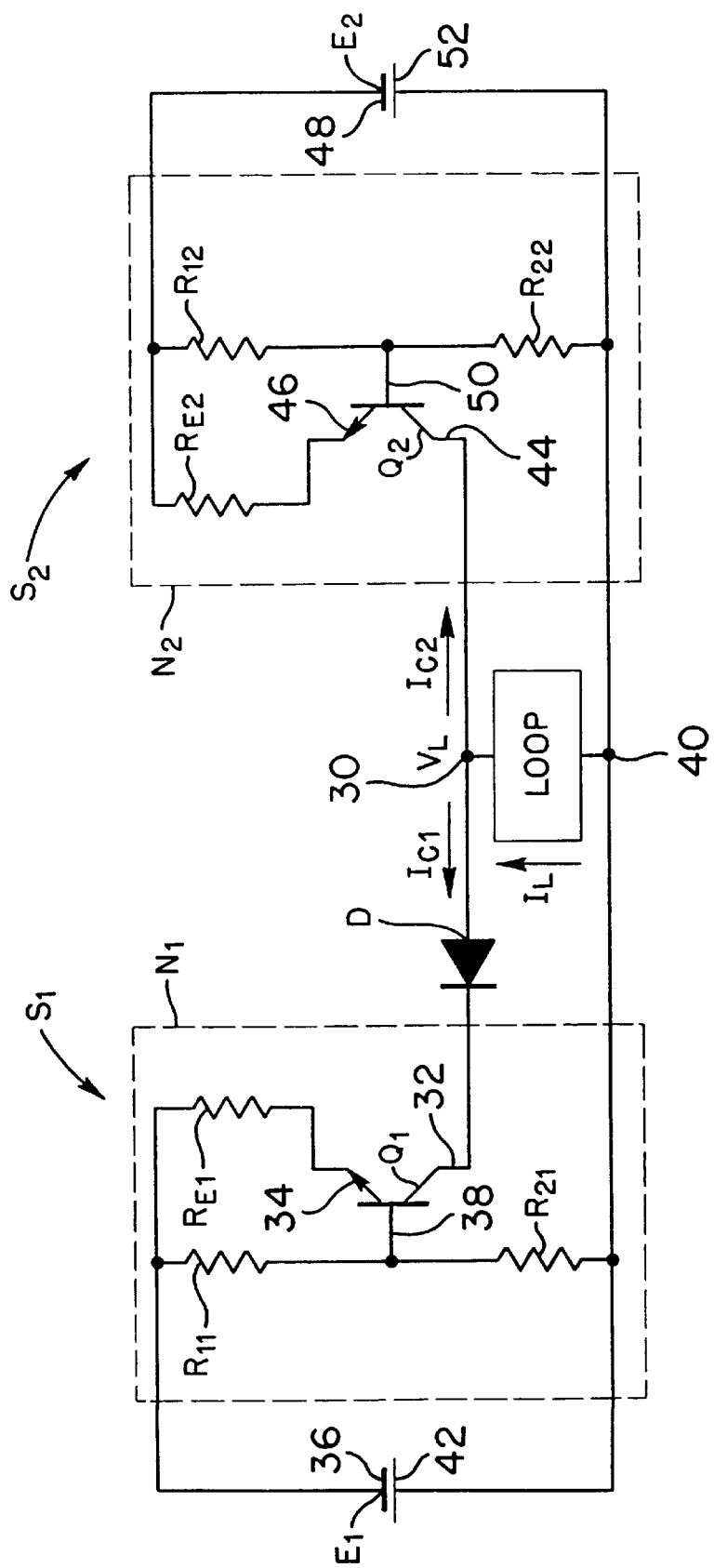
FIG. 5 is a detailed schematic representation of a preferred embodiment of the power feed circuit of FIG. 2.

FIG. 5 shows an embodiment of the circuit of FIG. 2 that approximates the ideal characteristic of FIG. 3(*c*). It employs two batteries, $E_1$ and $E_2$, two resistor-transistor networks, $N_1$ and $N_2$, and a semiconductor diode D. The elements $E_1$ and $N_1$ constitute the off-hook supply $S_1$ of FIG. 2, while $E_2$ and $N_2$ constitute the on-hook supply $S_2$. Batteries $E_1$ and $E_2$ may serve several loops, with a respective pair of networks $N_1$ and $N_2$ for each loop.

Since the actual circuit incorporates dissipative elements, it requires greater operating power than the ideal model in order to meet the specified on- and off-hook voltage and current conditions. The greatest operating power is drawn at the short-circuit condition, when all power is dissipated in networks $N_1$, $N_2$, and diode D while none is delivered to the loop.

Network $N_1$ is formed of an npn transistor $Q_1$ and resistors $R_{E1}$, $R_{11}$ and $R_{21}$. The diode D is connected between a loop terminal 30 of the power feed circuit and a collector terminal 32 of the transistor $Q_1$. The diode D has a polarity for conducting current only in the direction from the loop terminal 30 to the collector terminal 32 of transistor $Q_1$.

The resistor $R_{E1}$ is connected between an emitter terminal 34 of transistor $Q_1$ and a negative terminal 36 of battery $E_1$. Resistor $R_{11}$ is connected between a base terminal 38 of transistor $Q_1$ and the negative terminal 36 of battery $E_1$. Resistor $R_{21}$ is connected between the base terminal 38 of transistor $Q_1$ and another loop terminal 40 of the power feed circuit. The positive terminal 42 of the battery $E_1$ is also connected to loop terminal 40, and resistors $R_{11}$ and $R_{21}$ form a voltage divider for biasing the base of the transistor $Q_1$.

The network $N_2$ of the on-hook supply $S_2$ is formed of npn transistor $Q_2$ and resistors $R_{E2}$, $R_{12}$ and $R_{22}$. The collector terminal 44 of transistor $Q_2$ is connected to the loop terminal 30. The resistor $R_{E2}$ is connected between the emitter terminal 46 of transistor $Q_2$ and the negative terminal 48 of battery $E_2$. Resistor $R_{12}$ is connected between the negative terminal 48 of battery $E_2$ and the base terminal 50 of transistor $Q_2$. Resistor $R_{22}$ is connected between the base terminal 50 of transistor $Q_2$ and the loop terminal 40, to which the positive terminal 52 of the battery $E_2$ is also connected. The resistors $R_{12}$ and $R_{22}$ consequently form a voltage divider for biasing the base of transistor $Q_2$.

When the subscriber loop is in the off-hook condition, the loop current $I_L$ is a combination of the respective collector currents $I_{C1}$ and $I_{C2}$ of the transistors $Q_1$ and $Q_2$. When the loop is in the on-hook condition, the diode D is reverse-biased, and $I_L$ is entirely provided by the collector current of transistor $Q_2$.

The transistors $Q_1$ and $Q_2$ may each be realized by a type 2N4401 general-purpose silicon transistor available from Motorola. The diode D may also be formed by a transistor of the same type by connecting its base and collector terminals together to place its junctions in parallel. Those of ordinary skill in the art will recognize that other types of transistors and diodes may also be used. Also, as will be discussed below, the devices in the circuit of FIG. 5 may be fabricated as an integrated circuit, possibly also integrated with elements of the loop interface unit 22.

For the purposes of a design example which will now be presented, it will be assumed that the circuit is to operate at 20° C. and the devices will be assumed to exhibit nominal values, which can be found at Appendix K, pages 1073–1077 of the *Art of Electronics,* by Horowitz and Hill, Second Edition, 1989. Compliance with the nominal desired characteristics will also be assumed. Those of ordinary skill in the art will be able to modify the calculations set forth below to take into account tolerances in the device parameters, as well as other operating conditions.

DESIGN OF ON-HOOK SUPPLY

In a first part of this design example, the on-hook supply $S_2$ will be considered.

Since even a real semi-conductor diode is essentially ideal when it is reverse-biased (i.e., there is essentially no reverse current), the total loop current, as noted above, is the same as $I_{C2}$ (the collector current of transistor $Q_2$) when the loop is in an on-hook condition. The values for the battery $E_2$ and the resistors $R_{E2}$, $R_{12}$ and $R_{22}$ can therefore be selected to provide $V_2$ and $I_2$ to meet the desired minimum limits of 21 V and 2 mA. Initially, approximate design parameters will be proposed and then a more specific design corresponding to a more exact circuit model will be developed.

Figure 6:
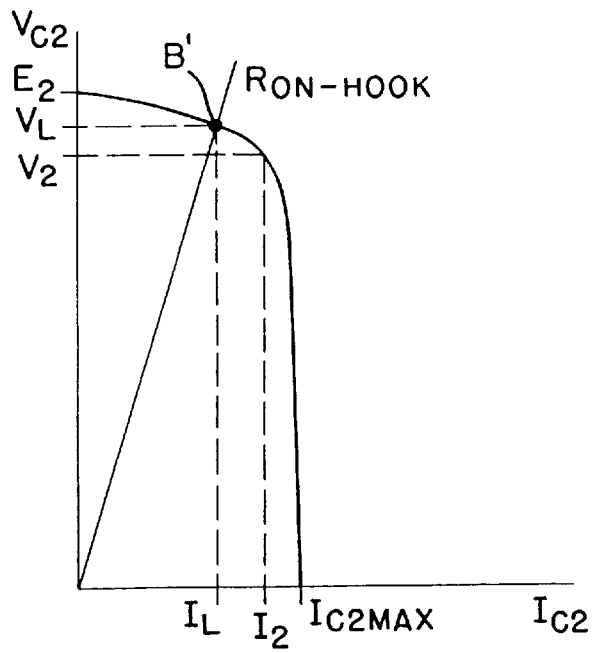
FIG. 6 illustrates the current supply characteristic of an on-hook supply portion of the circuit of FIG. 5.

FIG. 6 shows a current supply characteristic which substantially corresponds to the characteristic of FIG. 3(*b*) but can actually be achieved with real circuit elements. The actual loop voltage $V_L$ and current $I_L$ are given by the point B' at which the characteristic of FIG. 6 intersects with the on-hook load line. The initial part of the design task is to provide an actual characteristic that satisfies the limiting on-hook current and voltage values $I_2$=2 mA and $V_2$=21 V. The open-circuit value of $V_L$ is the potential provided by battery $E_2$, which is somewhat greater than $V_2$; the short-circuit value of $I_L$; $I_{C2MAX}$, is somewhat greater than $I_2$.

The elements of $S_2$ should be chosen so that the power delivered to the loop, $V_L I_L$, is greatest at the point $V_2,I_2$. The condition for this is $$\frac{d}{dI_{C2}}(V_{C2}I_{C2}) = 0 \quad (1)$$

which requires $$\frac{dV_{C2}}{dI_{C2}} = -\frac{V_{C2}}{I_{C2}} \quad (2)$$

While this requirement can be evaluated exactly only when $V_L(I_L)$ is known, the point where it is satisfied will clearly be near the "knee" of the characteristic.

As noted before, resistors $R_{12}$ and $R_{22}$ form a voltage divider, which forward biases the emitter-base junction of $Q_2$ and reverse biases the collector-emitter junction. As will be seen, the selection of the values for the resistors $R_{12}$ and $R_{22}$ making up the voltage divider is subject to a trade-off. On one hand, it is desirable to minimize the combined value of these resistors in order to minimize the effect of the base current upon the voltage at the base of transistor $Q_2$. On the other hand, it is desirable to maximize the combined value of these resistors in order to minimize power loss due to current through the voltage divider.

Figure 7:
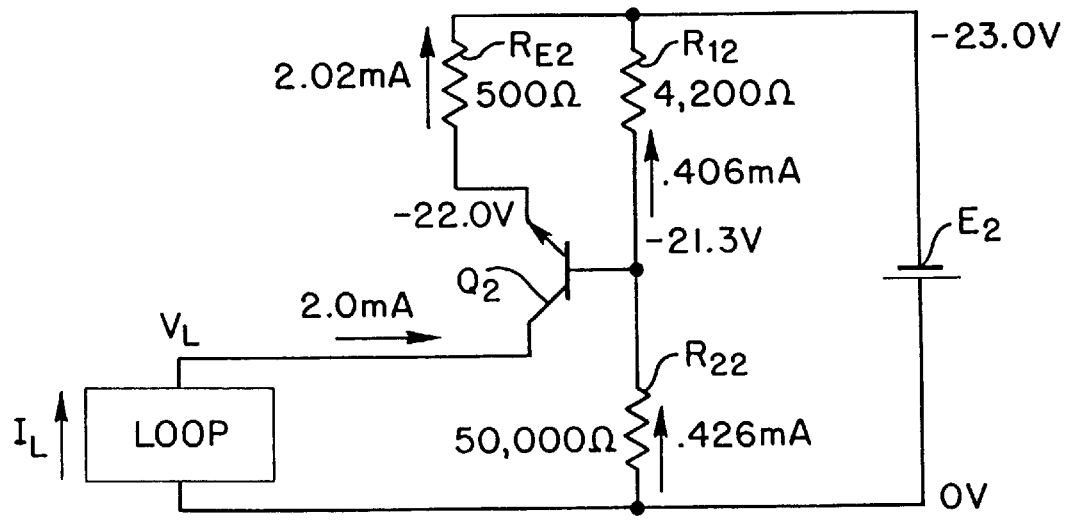
FIG. 7 illustrates circuit component values set according to an approximate design process for the on-hook supply portion of the circuit of FIG. 5.

FIG. 7 shows circuit element values chosen in an attempt to approximate an optimal design. For on-hook values of the loop resistance $R_L$, $Q_2$ should be in or near saturation, so that the collector-emitter voltage $V_{CE2}$ is minimized. Consequently, the loop voltage $V_L$ differs from the voltage provided by battery $E_2$ mainly by the quantity $I_{E2} \cdot R_{E2}$. The value of $E_2$ should therefore be chosen to be somewhat higher than the required voltage $V_2$, and $R_{E2}$ should be quite small compared with the quotient obtained by dividing the value of $E_2$ by the desired on-hook loop current $I_2$. For example, to achieve $V_2$=21 V, it would be reasonable to design for a (24±1) V battery so that the worst-case value of $E_2$ is 23 V. Then for $I_2$=2 mA, a reasonable choice might be $R_{E2}$=500Ω, for which $I_{E2}R_{E2}$=1 V. Then $V_2$ will be at least 21 V as long as the collector-emitter voltage of $Q_2$ in saturation is less than 1 V.

In order to reduce the power consumed by the bias network, the value of ($R_{12}+R_{22}$) should be appreciably larger than $E_2/I_2$: that is, appreciably larger than 11,500Ω. However, ($R_{12}+R_{22}$) should be small enough that, when $Q_2$ is out of saturation, its emitter-base voltage is predominantly determined by the voltage divider action of $R_{12}$ and $R_{22}$ and is relatively unaffected by the base current. For $h_{FE}=100$, these conditions could be satisfied by choosing $R_{22}=50,000Ω$ which would provide a current through the voltage divider that is roughly twenty times the nominal base current of 20 μA. Then, since the base-emitter voltage is about 0.7 V, $R_{12}$ should be about 1.7 V/0.406 mA=4,200Ω.

Maximum power is drawn from $E_2$ when the loop is short-circuited. Considering base current to be negligible, this would be $$P_{2MAX}=(23\ V)\ (2.0\ mA)+(23\ V)^2/54,200Ω=56\ mW$$

The power delivered to the loop is 42 mW, which meets the design objective.

A more precise set of circuit element values can be derived by using a standard transistor model and typical transistor parameters. One result of this approach will be a more accurate formula for the value of $R_{12}$ that will produce a given short-circuit current $I_{C2MAX}$. Following from this result is an expression for the greatest operating power. A third result is a form of the condition for maximum loop power (equation 2) that can be solved numerically for any circuit element values, using standard data concerning the relationship between $Q_2$'s collector-emitter voltage $V_{CE2}$ and base current $I_{B2}$.

For typical solutions, $I_2$ is found to be very nearly equal to $I_{C2MAX}$. Moreover, in circuits designed for different values of $I_{C2MAX}$, in which resistance values are scaled inversely with $I_{C2MAX}$, the optimum collector-emitter voltage of $Q_2$ is found to be less than one volt and is quite independent of $I_{C2MAX}$. Thus, the appropriate value of $R_{12}$ can be calculated for any desired $I_2$.

In general, the circuit equations for on-hook supply $S_2$ are $$I_{12}R_{12}=V_{BE}+(I_{C2}+I_{B2})R_{E2} \quad (3)$$

and $$E_2=I_{12}R_{12}+(I_{12}+I_{B2})R_{22} \quad (4)$$

where $I_{12}$ is the current through $R_{12}$.

Solving equations (3) and (4) to eliminate $I_{12}$ yields:

$$I_{C2} = \frac{\frac{1}{R_{E2}}\left(E_2 \frac{R_{12}}{R_{12}+R_{22}} - V_{BE2}\right)}{1+\frac{1}{h_{FE2}}\left[1+\frac{1}{R_{E2}}R_{12}\frac{R_{22}}{(R_{12}+R_{22})}\right]} \quad (5)$$

where $h_{FE2}$ is the common-emitter current gain of $Q_2$:

$$h_{FE2} = \frac{I_{C2}}{I_{B2}}$$

According to a frequently used model, the base-emitter voltage $V_{BE2}$ is logarithmically related to the collector current, $I_{C2}$, as follows:

$$V_{BE2} = V_K + V_T \ln\left(\frac{I_{C2}}{I_k}\right) \quad (6)$$

Here, $V_T$ is the physical constant kT/q, which is 25.3 mV at 20° C. An appropriate value of the constant $V_k$ may be determined from the data sheets for the selected transistor. In the case of the above-mentioned Motorola type 2N4401 transistor, relevant data curves are found in FIG. 17, on page 1077 of the Horowitz and Hill reference mentioned above. If operation of $Q_2$ in the active region is to be modelled with $I_{C2}$ in the vicinity of 10 mA, the curve for $V_{BE(on)}$ shows it to be 0.67 V at $I_C$=10 mA. Hence the model becomes $$V_{BE2} = 0.67V + (0.0253V)\ln\left(\frac{I_{C2}}{10\,mA}\right) \quad (7)$$

For values of collector current that are in the active region, $h_{FE2}$ is considerably greater than unity and is effectively constant. Under these conditions, equation 5 is satisfied by a unique value of $I_{C2}$, independent of $V_{C2}$. That is, the circuit acts effectively as a constant-current source, with:

$$\frac{dV_{C2}}{dI_{C2}} = \infty.$$

It is these conditions that obtain at the short-circuit point. It is thus of interest to calculate the value of $R_{12}$ that is required to produce a specified short-circuit value of $I_{C2}$, $I_{C2MAX}$. For this purpose, equation 5 may be rewritten as follows:

$$R_{12} = \frac{R_{22}\left[R_{E2}I_{C2MAX}\left(1+\frac{1}{h_{FE2}}\right)+V_{BE2}\right]}{E_2 - V_{BE2} - I_{C2MAX}\left[R_{E2}+\frac{R_{22}+R_{E2}}{h_{FE2}}\right]} \quad (8)$$

For the same values used above ($R_{E2}$=500Ω, $R_{22}$=50,000Ω, $h_{FE}$100, $E_2$23 V), this more accurate formula indicates that $R_{12}$ should be 4,025Ω for $I_{C2MAX}$=2.0 mA, not greatly different from 4,200Ω as calculated approximately above.

Equation 8 is not very sensitive to $h_{FE}$. For example, $R_{12}$ would be 4,261Ω or 3,898Ω for $h_{FE}$ equal to 50 or 200 respectively. In the range of $h_{FE}$ specified for $Q_2$ as 80 or greater, the calculated range of $R_{12}$ is 4,081Ω ($h_{FE}$=80) to 3,811Ω ($h_{FE}$=∞). Because the specified value of $I_2$ is a minimum, the larger value, 4,081Ω, should be chosen.

As mentioned above, the greatest power is required from on-hook supply $S_2$ when the loop is short-circuited. This is $P_{2MAX}=E_2(I_{C2}+I_{B2}+I_{12})$, with all variables evaluated for short-circuit conditions. Substituting from equation (4) and rearranging, this becomes $$P_{2MAX} = E_2 I_{C2MAX}\left[1+\frac{1}{h_{FE}}\left(\frac{R_{12}}{R_{12}+R_{22}}\right)\right] + \frac{E_2^2}{R_{12}+R_{22}} \quad (9)$$

In practice, $h_{FE}$ is large and $R_{12}$ is much less than $R_{22}$. Thus, there is only a very small difference between this more accurate expression and the calculation made above in connection with FIG. 7.

Of course, when the load is not a short circuit (and especially for larger values of $V_{C2}$), it is no longer true that $h_{FE}$ is constant. However, it turns out that for practical circuit parameters, maximum efficiency occurs when $h_{FE}$ is still at 70–80% of its greatest value. Moreover, at this point, the reduction in $h_{FE}$ is mainly due to increased base current, so the value of $I_2$ is only very slightly different from $I_{C2MAX}$. The following analysis makes use of the fact that $I_{C2}$ is essentially constant under the conditions that are of most interest: the range of loop resistance between the optimum value $V_2/I_2$ and a short circuit.

In order to find $$\frac{dV_{C2}}{dI_{C2}},$$

we start with:

$$V_{C2} = E_2 - (I_{B2} + I_{C2})R_{E2} - V_{CE2}(I_{B2}) \quad (10)$$

then:

$$\frac{dV_{C2}}{dI_{C2}} = -R_{E2} - \frac{dI_{B2}}{dI_{C2}}\left[R_{E2} + \frac{dV_{CE2}}{dI_{B2}}\right] \quad (11)$$

and:

$$I_{C2}\frac{dV_{C2}}{dI_{C2}} = -I_{C2}R_{E2} - \frac{dI_{B2}}{dI_{C2}}\left[I_{C2}R_{E2} + I_{C2}\frac{dV_{CE2}}{dI_{B2}}\right] \quad (12)$$

To find $$\frac{dI_{B2}}{dI_{C2}},$$

it is useful to rewrite equation 5 in yet another form:

$$I_{B2} = \frac{E_2 \frac{R_{12}}{R_{12} + R_{22}} - R_{E2}I_{C2} - V_{BE2}}{R_{E2} + \frac{R_{12}R_{22}}{R_{12} + R_{22}}} \quad (13)$$

then:

$$\frac{dI_{B2}}{dI_{C2}} = \frac{-R_{E2} - \frac{dV_{BE2}}{dI_{C2}}}{R_{E2} + \frac{R_{12}R_{22}}{R_{12} + R_{22}}} \quad (14)$$

From equation (6):

$$\frac{dV_{BE2}}{dI_{C2}} = \frac{V_T}{I_{C2}} \quad (15)$$

Thus, substituting equation 15 in equation 14, substituting the result in equation 12, and rearranging:

$$I_{C2}\frac{dV_{CE2}}{dI_{B2}} = -I_{C2}R_{E2} + \left(I_{C2}\frac{dV_{C2}}{dI_{C2}} + I_{C2}R_{E2}\right)\frac{\left[R_{E2} + \frac{R_{12}R_{22}}{R_{12} + R_{22}}\right]}{R_{E2} + \frac{V_T}{I_{C2}}} \quad (16)$$

Then, for the maximum power condition (equation 2):

$$I_{C2}\frac{dV_{CE2}}{dI_{B2}} = -I_{C2}R_{E2} + (I_{C2}R_{E2} - V_2)\frac{\left[R_{E2} + \frac{R_{12}R_{22}}{R_{12} + R_{22}}\right]}{R_{E2} + \frac{V_T}{I_{C2}}} \quad (17)$$

Since in practice $V_T/I_{C2} << R_{E2}$, this may be approximated as:

$$I_{C2}\frac{dV_{CE2}}{dI_{B2}} = -I_{C2}R_{E2} + (I_{C2}R_{E2} - V_2)\left[1 + \frac{1}{R_{E2}}\left(\frac{R_{12}R_{22}}{R_{12} + R_{22}}\right)\right] \quad (18)$$

The left hand side of equation (18) contains parameters of $Q_2$ that may be measured or obtained from a manufacturer's data sheets. For a given circuit design, the optimum operating point $(I_2, V_2)$ may be found by evaluating the right hand side of this equation and then determining the values of $V_{CE2}$ and $I_{B2}$ that produce the same numerical value for the left hand side.

Figure 16:
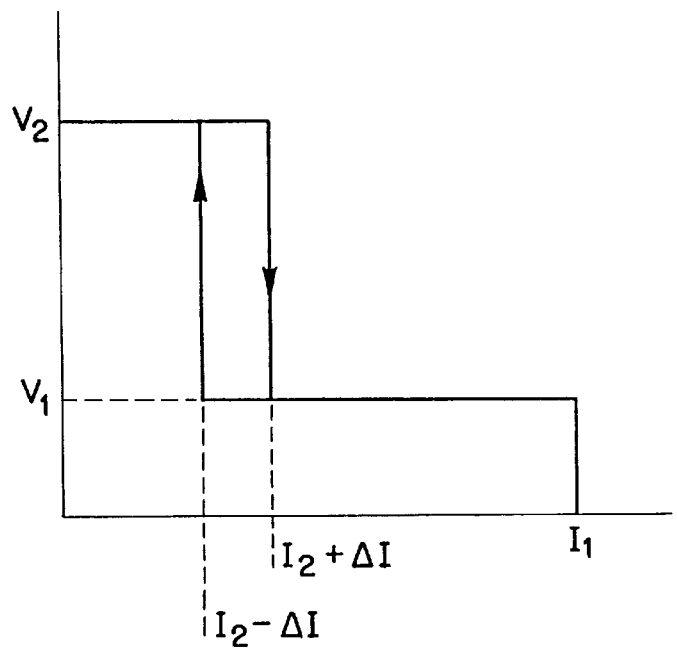
FIG. 16 shows an ideal current source characteristic for the circuit of FIG. 15.

For example, FIG. 16 on p. 1077 of Horowitz and Hill shows how $V_{CE}$ varies as a function of $I_B$ in and near the collector saturation region, with $I_C$ as a parameter. Because $I_C$ is constrained by the circuit to be practically constant in the region of interest, the slope of such a curve may be taken as the total derivative needed in equation 18 although of course it is actually a partial derivative. (The validity of this assumption will be verified: once $I_2$ has been determined, it will be seen that it is indeed very nearly the same as $I_{C2MX}$.)

Since no curve for the desired value of $I_C$ (2.0 mA) is provided, the behavior of circuits designed for 1.0 mA and 10 mA will be investigated, since these are the closest values for which data is available. In each case, $R_{E2}$ and $R_{22}$ will be scaled in inverse proportion to $I_C$, and $R_{12}$ will be calculated for $h_{FE2}=100$. Thus, we have:

| | | |
|---|---|---|
| $I_{C2MAX}$ | 1.0 mA | 10 mA |
| $R_{E2}$ | 1000Ω | 100Ω |
| $R_{22}$ | 100,000Ω | 10,000Ω |
| $V_{EB}$ | .612 V | .670 V (from Eq. 7) |
| $R_{12}$ | 7,959Ω | 826.8Ω (from Eq. 8) |

In each curve, the value of $I_B$ appears to approach an asymptotic value with increasing $V_{CE}$, as is appropriate when the operating condition changes from saturation to the active state. Near the asymptotic value, the curves are represented quite accurately by the expression $$\frac{1}{h_{FE}} = a + \frac{b}{V_{CE}}$$

where a and b depend on $I_C$. In particular, for the values of $I_C$ of interest, the following parameter values can be derived from the data curves:

| | | |
|---|---|---|
| $I_{C2MAX}$ | 1.0 mA | 10 mA |
| a | 0.0115 | 0.00816 |
| b | 0.00142 V | 0.00128 V |

Expressed in terms of this model, the left hand side of equation 18 is $$I_{C2} \frac{dV_{CE}}{dI_{B2}} = -\frac{b}{\left(\frac{1}{h_{FE}} - a\right)^2} \quad (19)$$

The right hand side depends upon a set of design values chosen for various circuit elements. For any such choice, after substitution from equation 19, equation 18 can be solved to yield an expression for $h_{FE}(I_2)$, the value of $h_{FE}$ at the optimum operating point, in terms of a and b, the parameters of the model. That is, if the right hand side of equation 18 is defined to be –A, $$h_{FE}(I_2) = \frac{1}{a + \sqrt{\frac{b}{A}}} \quad (20)$$

Equation 20 can be used to determine the relationship between the short-circuit current, $I_{C2MAX}$, and the current at the optimum operating point, $I_2$. First, from equation 5, their ratio can be approximated as $$\frac{I_{C2MAX}}{I_2} \cong \frac{1 + \frac{1}{h_{FE}(I_2)}\left[1 + \frac{1}{R_{E2}}\left(\frac{R_{12}R_{22}}{R_{12}+R_{22}}\right)\right]}{1 + \frac{1}{h_{FE}(I_{C2MAX})}\left[1 + \frac{1}{R_{E2}}\left(\frac{R_{12}R_{22}}{R_{12}+R_{22}}\right)\right]} \quad (21)$$

Equation 21 assumes that $V_{BE2}$ is the same for the two values of $I_{C2}$ considered, $I_{C2MAX}$ and $I_2$. This assumption is reasonable because, as will be seen, these values of $I_{C2}$ are nearly the same, and because $V_{BE2}$ is only weakly (logarithmically) related to $I_{C2}$ (equation 6).

Further approximation is justified under the conditions that are under consideration here. The quantity $$1 + \frac{1}{R_{E2}}\left(\frac{R_{12}R_{22}}{R_{12}+R_{22}}\right)$$

occurs in both the numerator and denominator of equation 21. In the circuit designs proposed above, this quantity is much smaller than either $h_{FE}(I_2)$ or $h_{FE}(I_{C2MAX})$. This is because $$R_{12} \ll R_{22}$$

and $$\frac{R_{12}}{R_{E2}} \ll h_{FE}.$$

For example, $$\frac{R_{12}}{R_{22}} \cong 0.08, \frac{R_{12}}{R_{E2}} \cong 8,$$

and $$h_{FE} \cong 100.$$

When equation 21 is expanded, assuming the above inequalities and including only first order terms, the result is:

$$\frac{I_{C2MAX}}{I_2} \cong 1 + \left[1 + \frac{1}{R_{E2}}\left(\frac{R_{12}R_{22}}{R_{12}+R_{22}}\right)\right]\left[\frac{h_{FE}(I_{C2MAX}) - h_{FE}(I_2)}{h_{FE}(I_{C2MAX})h_{FE}(I_2)}\right] \quad (22)$$

As mentioned above, $h_{FE}$ reaches an asymptotic value, 1/a, as $V_{CE}$ increases into the active region, out of saturation. It is this asymptotic value that will exist at the short-circuit point, where $$V_{CE} \cong E_2 - R_{E2}I_{C2MAX}.$$

That is, the relative error in neglecting the second term in the model for $1/h_{FE}$ is $b/(aV_{CE})$. Using the empirical values of a and b given above for both the 1.0 mA and 10 mA circuits (for both of which $V_{CE}$=23 V–1 V=22 V), the relative error for the 1.0 mA circuit is 0.6% and, for the 10 mA circuit, 0.7%. These errors are negligible, considering that the model itself is only an approximation. Thus, $$h_{FE}(I_{C2MAX}) \cong \frac{1}{a}.$$

Making use of this as well as equation 20, equation 22 may be evaluated in terms of the parameters of the model, with $$\frac{h_{FE}(I_{C2MAX}) - h_{FE}(I_2)}{h_{FE}(I_{C2MAX})h_{FE}(I_2)} \cong \sqrt{\frac{b}{A}} \quad (23)$$

Finally, the value of $V_{CE}$ at the optimum operating point may be expressed in terms of the model through the use of equation 20:

$$V_{CE}(I_2) = \sqrt{bA} \quad (24)$$

The above formulas may be applied in an iterative process, in which a desired value of $V_2$ is used to calculate a first value of A, which leads to a value of $V_{CE}$ from equation 24 and hence a new value of $V_2$. The process is highly convergent so that even a second pass is unnecessary. A first pass produces the following numerical results:

| | 1.0mA | 10mA | |
|---|---|---|---|
| $I_{C2MAX}$ | | | |
| A | 168.4V | 173.7V | |
| $\sqrt{\frac{b}{A}}$ | 0.00290 | 0.00271 | |
| $\frac{I_{C2MAX}}{I_2}$ | 1.025 | 1.023 | (from Eqs. 22, 23) |
| $V_{CE}(I_2) \left(= \sqrt{bA}\right)$ | .49V | .47V | |
| $h_{FE}(I_{C2MAX}) (= 1/a)$ | 87.0 | 122.5 | |
| $h_{FE}(I_2)$ | 69.4 | 92.0 | (from Eq. 20) |
| $V_2$ | 21.50V | 21.52V | |
| $V_2/I_2$ | 21,500Ω | 2,152Ω | |

These figures are not substantially changed by iteration. For the 10 mA case, the results of the first, second, and third passes for $V_{CE}$ are 0.472, 0.478, and 0.477 V.

There are several noteworthy conclusions from these results:

1. Using this more accurate design method (which takes base current into account), circuits designed for a short-circuit current of either 1.0 or 10 mA have an optimum operating point at which $h_{FE}$ is still relatively large.

2. For both the 1.0 mA and 10 mA circuits, the short-circuit current is only 2.5% greater than the current at the optimum operating point. This validates the assumption made in connection with equation 21.

3. For both the 1.0 mA and 10 mA circuits, the collector-emitter drop at the optimum operating point is about 0.5 V. The value of 1.0 V that was used in the approximate design method led to the choice of 500Ω for $R_{E2}$. It appears that $R_{E2}$ could have been made somewhat larger or $E_2$ smaller.

4. The assumptions that the current at the optimum operating point is essentially the same as the short-circuit current and that the collector-emitter drop at the optimum operating point is small and essentially constant hold true over a wide range of design current values.

For an optimum operating point at 2.0 mA, a circuit should be designed for a short-circuit current of 2.05 mA, since $$\frac{I_{C2MAX}}{I_2} \cong 1.025$$

Then, rather than 4,081Ω as calculated above from equation 8, $R_{12}$ becomes 4,183Ω. Thus, the value of 4,200Ω that resulted from the approximate method is a reasonable design value.

The above numerical results show that $Q_2$ is close to saturation at the optimum operating point. For larger values of $R_L$, $Q_2$ will be in saturation, with a collector-emitter voltage, $V_{CESAT}$, of the order of 0.1 V. As $R_L$ increases, $V_L$ increases, becoming nearly equal to $E_2$ when the loop is open.

In saturation, $I_{B2}$ can exceed $I_{C2}$. In fact, $I_{C2}$ will be zero for a value of $I_{B2}$ that can be determined by solving equation 13, assuming that under these conditions the relationship between $V_{BE2}$ and $I_{B2}$ is the same as that between $V_{BE2}$ and $I_{C2}$ in equation 7. For the design values proposed above, for $I_{C2}=0$, $I_{B2}$ will be 0.28 mA and $V_L$ will be 22.7 V.

The same general principles discussed above in connection with on-hook supply $S_2$ apply to off-hook supply $S_1$, with the exception that, while the collector voltage of $Q_2$ is $V_L$, that of $Q_1$ is $V_{L+VD}$, where $V_D$ is the diode voltage. Although the loop current $I_L$ is the sum of $I_{C1}$ and $I_{C2}$, when the loop is open and for large values of loop resistance down to the optimum operating point of $S_2$, D is back-biased, $Q_1$ is saturated, and $I_{C1}$, is very small. $I_{C1}$ was previously assumed to be zero under these conditions for the purpose of selecting the components of $S_2$.

When loop resistance is further decreased to the point where D is forward biased, $V_D$ is related to $I_{C1}$ by an equation similar to equation 6:

$$V_D = V_k + mV_T \ln\left(\frac{I_{C1}}{I_k}\right) \quad (26)$$

Figure 8:
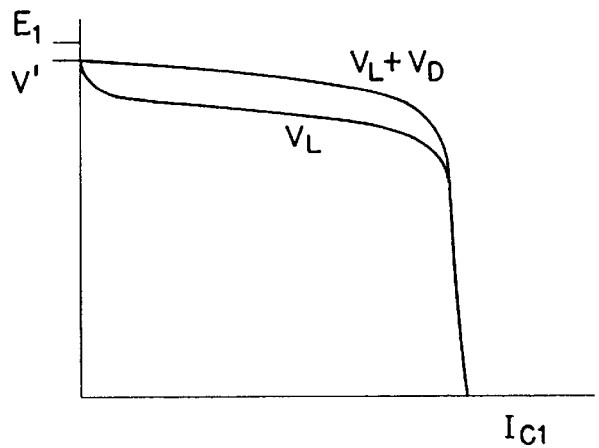
FIG. 8 graphically represents the current source characteristic of the off-hook supply portion of the circuit of FIG. 5.

Here, $V_T$ is as defined for equation 6, m is a constant between 1 and 2, and $V_K$ and $I_K$ are device-specific but have values similar to those given above for $Q_2$. This forward-bias condition will set in when $V_L$ is slightly less than $E_1$, at a point V' where $I_{C1}=0$, as shown in FIG. 8. This point may be calculated by the procedure outlined above for the condition $I_{C2}=0$. As indicated in FIG. 8, when D is forward-biased, its voltage drop of about 0.7 V is subtracted from the collector voltage that would be calculated according to the methods used for designing the on-hook supply. FIG. 8 is to be compared with the ideal source characteristic of FIG. 3(a).

Figure 9:
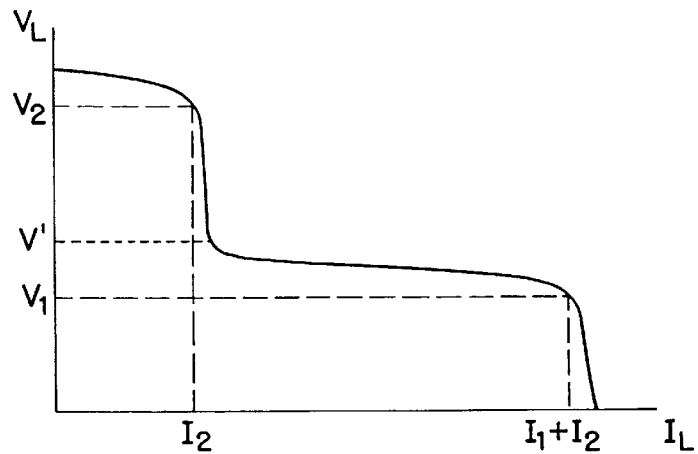
FIG. 9 graphically represents the combined current supply characteristic of the circuit of FIG. 5.

Thus, combining FIGS. 6 and 8, the circuit of FIG. 5 has the source characteristic of FIG. 9, which is to be compared with the ideal characteristic of FIG. 3(c).

At V', since $E_1$ is appreciably less than $E_2$, $I_{C2}$ is essentially constant and equal to its short-circuit value as discussed above. Thus, the optimum operating point can be determined for $S_1$ independently of $S_2$.

Because D is in series with the loop, the condition equivalent to equation 2 is:

$$\frac{dV_{C1}}{dI_{C1}} = \frac{dV_D}{dI_{C1}} - \frac{V_{C1} - V_D}{I_{C1}} = \frac{mV_T}{I_{C1}} - \frac{V_{C1} - V_D}{I_{C1}} \quad (27)$$

However, for the specific design presented below, $$\frac{mV_T}{I_{C1}} \sim 2\,\Omega,$$

while $$\frac{V_{C1} - V_D}{I_{C1}} = 500\,\Omega,$$

so very nearly $$\frac{dV_{C1}}{dI_{C1}} = -\frac{V_{C1} - V_D}{I_{C1}},$$

and the equivalent of equation 18 becomes:

$$I_{C1}\frac{dV_{CE1}}{dI_{B1}} = -I_{C1}R_{E1} + (I_{C1}R_{E1} - V_1 + V_D)\left[1 + \frac{1}{R_{E1}}\left(\frac{R_{11}R_{21}}{R_{11} + R_{21}}\right)\right] \quad (28)$$

This will be used below to determine the optimum operating point of off-hook supply $S_1$.

After $I_2$ has been chosen to be 2.0 mA, the off-hook supply $S_1$ is required to be optimized for $I_1=18$ mA. The optimization process is similar to that for on-hook supply $S_2$ as outlined above in conjunction with FIG. 6. Here, it seems reasonable to expect an operating range for $E_1$ of (12±1) V and thus to design for $E_1=11.0$ V.

Figure 10:
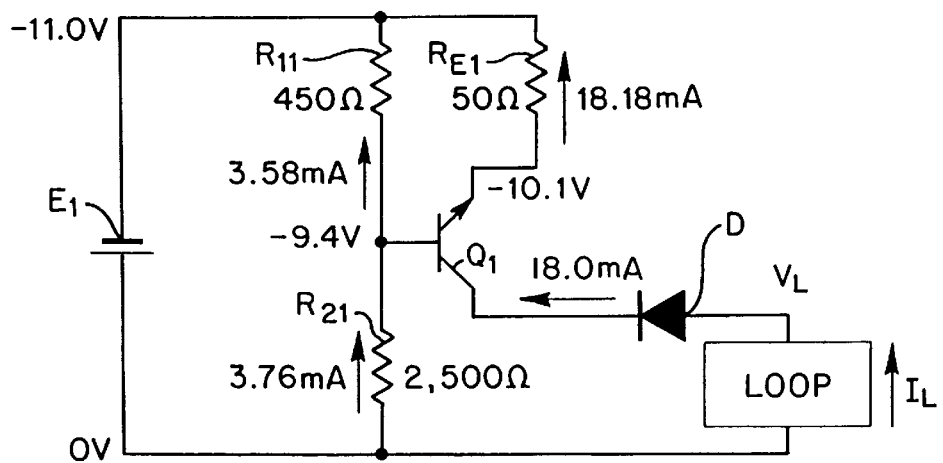
FIG. 10 shows circuit component values obtained as a result of an approximate design process for the off-hook supply portion of the circuit of FIG. 5.

With the loop short-circuited, the diode D will be forward biased so that both supplies $S_1$ and $S_2$ provide current. According to the on-hook supply example given above, supply $S_2$ will provide 2.05 mA. Assuming the same ratio of short-circuit to optimum currents, the off-hook supply should provide 18.45 mA. At the operating point of $V_L=9.0$ V, $I_{C1}=18.45$ mA, diode D will also be conducting. From equation 7, $V_{BE1}=0.685$ V for $I_{C1}=18$ mA. Further assuming the same 0.5 V optimum collector-emitter drop as determined in regard to the on-hook supply, the emitter should be at approximately −10.1 V as shown in FIG. 10. For a reasonably large value of $h_{FE}$, this is consistent with $R_{E1}=50\Omega$. Assuming a base-emitter drop of 0.7 V, the base will be at −9.4 V, and if $R_{21}$ is chosen at 2,500Ω, its current will be 3.76 mA, reasonably large compared with the base current. Assuming $h_{FE}=100$, $R_{11}$ should be [(18 mA) (1.01) (50Ω)+0.7 V]/(3.76 mA−0.18 mA)=450Ω.

The optimization procedure for off-hook supply $S_1$ follows the same steps as those utilized for the on-hook supply $S_2$, with the quantity −A now taken as the right hand side of equation 28 instead of equation 18. The circuit equations for off-hook supply $S_1$ are identical to those of on-hook supply $S_2$ (equations 3 and 4), with appropriate substitutions. Thus equation 8 may be used to calculate $R_{11}$ for any desired short-circuit current. In order to check whether the conclusions stated in regard to on-hook supply $S_2$ apply to the design of off-hook supply $S_1$, we scale the values of FIG. 10 for a short-circuit current of 10 mA, as follows:

| | |
|---|---|
| $I_{C1MAX}$ | 10 mA |
| $R_{E1}$ | 90Ω |
| $R_{21}$ | 4,500Ω |
| $V_{BE}$ | .670 V |
| $R_{11}$ | 792Ω |

Then, assuming a diode drop of 0.700 V, the same iterative process employed for the on-hook supply is applied as follows:

| | |
|---|---|
| A | 63.6V |
| $\sqrt{\dfrac{b}{A}}$ | 0.00448 |
| $I_{C1MAX}/I_1$ | 1.038 |
| $V_{CE}(I_1) = \sqrt{bA}$ | .28V |
| $h_{FE}(I_1)$ | 79.1 |
| $V_1$ | 9.106V |
| $V_1/I_1$ | 910.6Ω |

Just as for the on-hook supply, at the optimum operating point $V_{CE}$ is less than 1 V, $h_{FE}$ is still quite high, and $I_{C1MAX}$ and $I_1$ are very nearly the same.

Finally, we use the above results to recalculate components of $S_1$ for $h_{FE}$=79 and a desired short-circuit current of 1.038 (20.00 mA−2.05 mA)=18.63 mA. From equation 8, the value of $R_{11}$ becomes 463Ω.

Figure 11:
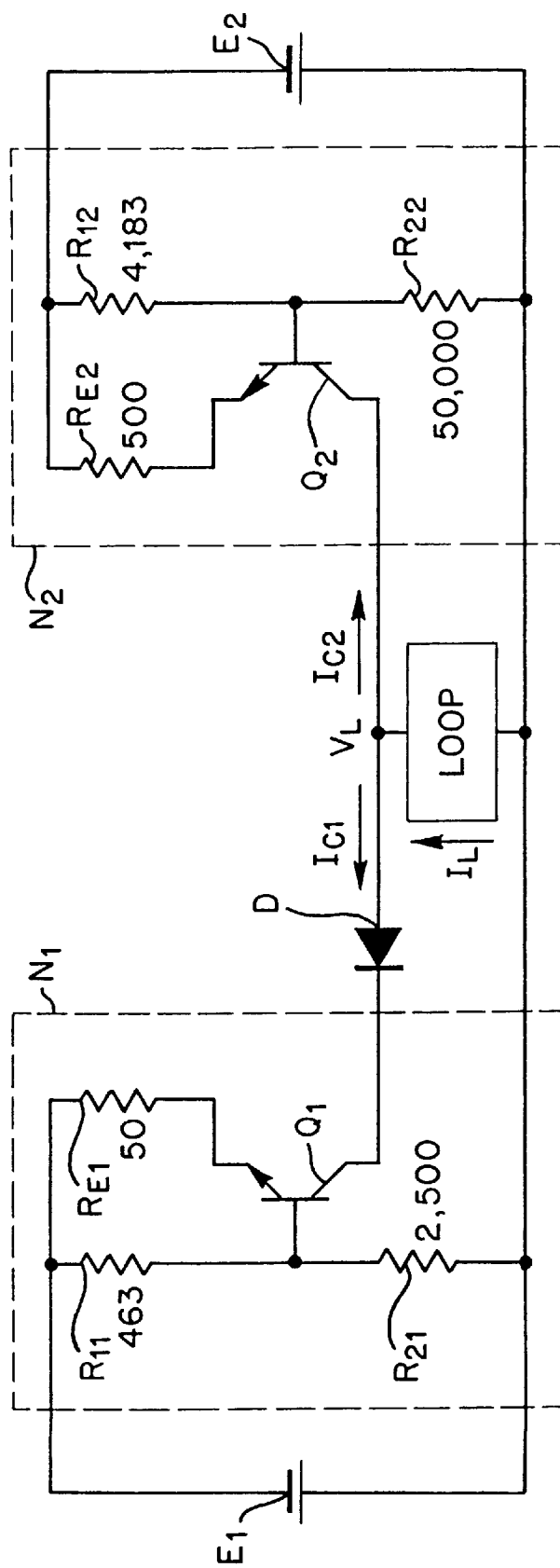
FIG. 11 shows circuit component values obtained as a result of a more precise design procedure for the circuit of FIG. 5.

The design methods outlined here lead to nominal resistance values shown in FIG. 11. With these values, the circuit marginally satisfies the on-hook and off-hook voltage requirements given in section 2 when $E_1$=11 V and $E_2$=23 V.

On the other hand, the greatest power is drawn when $E_1$=13 V, $E_2$=25 V, and the loop has zero resistance. For these conditions, current and power values are calculated using equations 5 and 9:

| | Marginal Loop Voltage | Worst-Case Operating Power |
|---|---|---|
| $E_1$ | 11 V | 13 V |
| $E_2$ | 23 V | 25 V |
| $I_{C1MAX}$ | 18.63 mA | 24.63 mA |
| $I_{C2MAX}$ | 2.05 mA | 2.39 mA |
| $I_{LMAX}$ | 20.68 mA | 27.02 mA |
| $P_{1MAX}$ | 246 mW | 378 mW |
| $P_{2MAX}$ | 57 mW | 71 mW |
| $P_{1MAX} + P_{2MAX}$ | 303 mW | 449 mW |

The circuit presented here meets standard requirements, providing 20 mA for a 450Ω off-hook loop and 21 V for an on-hook loop. Moreover it permits the on-hook loop resistance to be much less than the 5Ω standard, allowing as much as 42 mW to be drawn: 2 mA at 21 V for 10,500Ω.

The design example given above assumes that the batteries or voltage sources used have tolerances of±1 V. The design method described herein can be used to take account of tolerances and environmental variations in other components as well.

The maximum power dissipated (for a worst-case battery and a short-circuited loop) is 449 mW. Even a circuit with ideal characteristics would dissipate 244 mW under these conditions. On the other hand, to meet the 21 V standard even marginally, a conventional current feed circuit consisting of a battery and current-limiting resistor to provide an optimum resistance of 600Ω would dissipate 735 mW (=$21^2$÷600). The dual power feed circuit disclosed herein provides substantial efficiencies in terms of minimizing loop power, which is an important cost element in providing network services.

Figure 12:
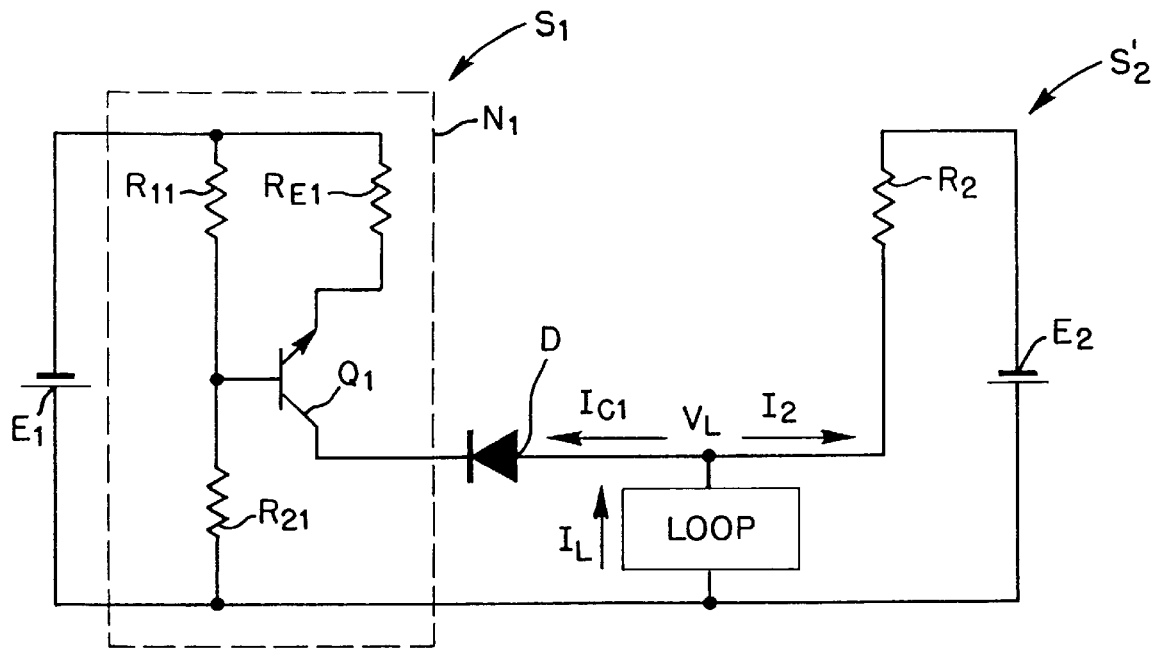
FIG. 12 is a schematic representation of an alternative preferred embodiment of the circuit of FIG. 2, with a lower on-hook power supply capability than the circuit of FIG. 5.
Figure 13:
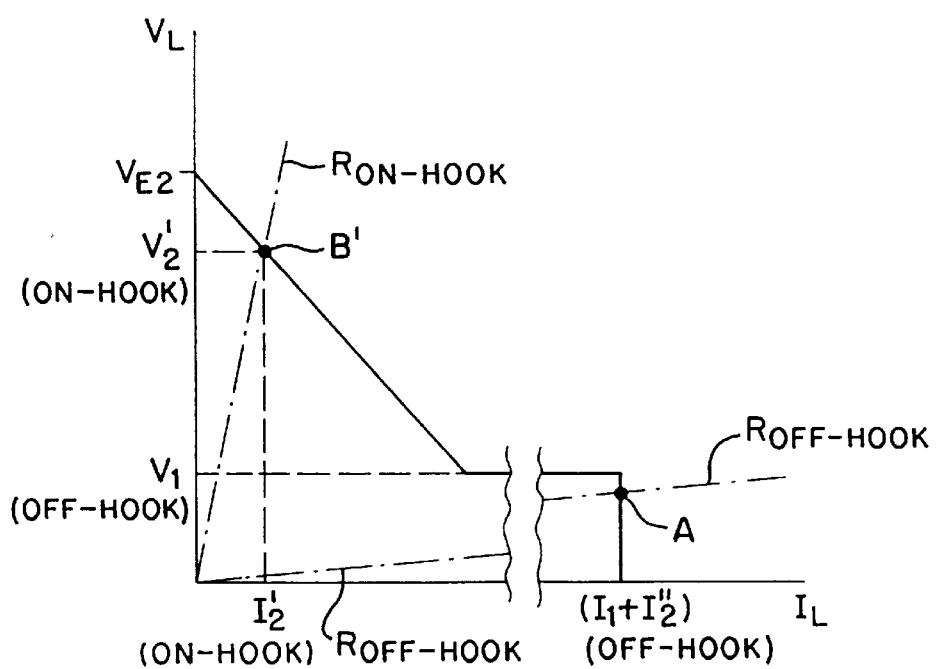
FIG. 13 shows an ideal current source characteristic of the circuit of FIG. 12.

It is contemplated to simplify the power feed circuit of the present invention, as indicated in FIG. 12, for cases in which it is not required to supply an appreciable amount of on-hook power. As seen from FIG. 12, the off-hook supply $S_1$ may be unchanged from the circuit shown in FIG. 5, but the on-hook supply is simplified so as to consist only of the battery $E_2$ and a current-limiting resistor $R_2$. The resistor $R_2$ should be selected to be substantially smaller than the on-hook load resistance, to provide an operating characteristic shown in idealized form in FIG. 13.

Figure 14:
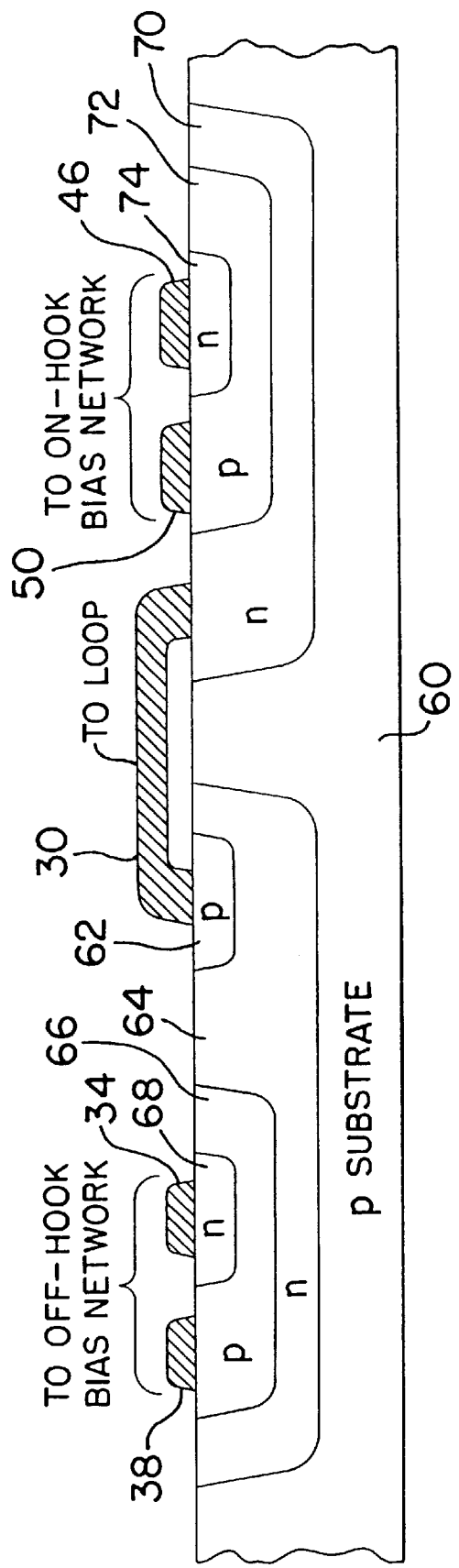
FIG. 14 schematically illustrates in cross-section a semiconductor implementation of the transistors and the diode included in the power feed circuit of FIG. 5.

FIG. 14 is a schematic cross-sectional view of a semiconductor implementation in which the transistors $Q_1$ and $Q_2$ of FIG. 5 and the diode D are provided in a single integrated circuit, which may also optionally include other functions of the SCIU or ONU. In FIG. 14, a p substrate 60 has formed therein an n region 64 and a p region 62 which form the diode D. The transistor $Q_1$ is constituted by the n region 64 together with a p region 66 and an n region 68. Terminals 34 and 38 in FIG. 14, which correspond to those shown in FIG. 5, are available to connect transistor $Q_1$ to the off-hook bias network of FIG. 5.

The transistor $Q_2$ is constituted by n region 70, p region 72 and n region 74. The terminals 46, 50 shown in FIG. 14 correspond to those shown in FIG. 5.

Figure 15:
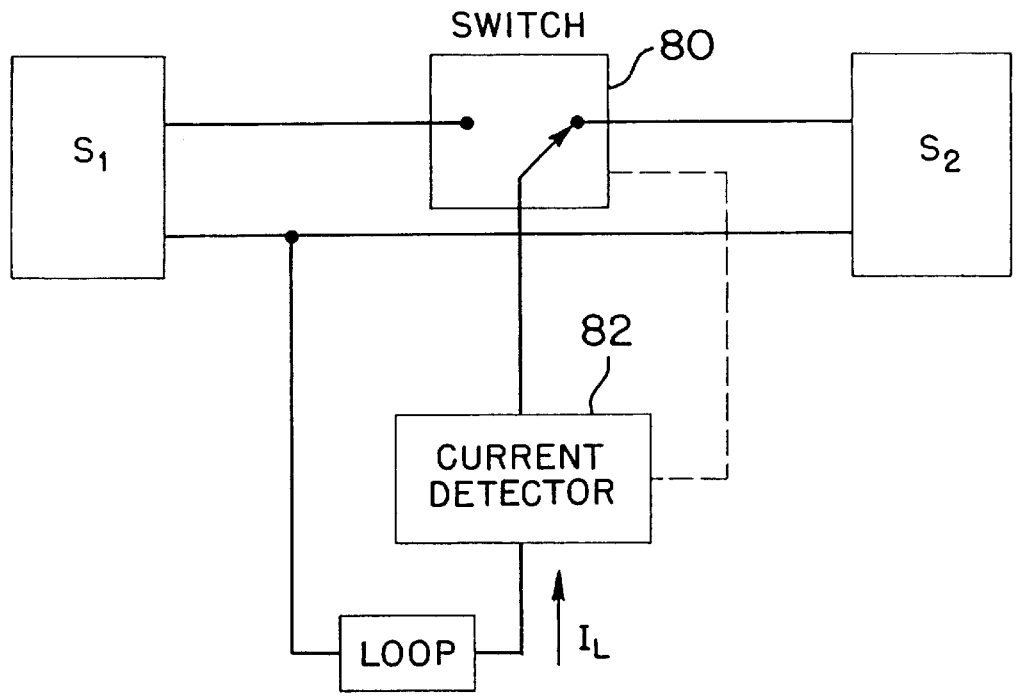
FIG. 15 is a schematic block illustration of a subscriber loop power feed circuit according to an alternative embodiment of the invention.

Another alternative to the power feed circuit of FIG. 5 (which departs from the circuit of FIG. 2, as well) is shown in FIG. 15. In the power feed circuit of FIG. 15, the diode D of FIGS. 2 and 5 is replaced by a switch 80 controlled by a current detector 82. The off-hook supply $S_1$ and on-hook supply $S_2$ shown in FIG. 15 may be similar to those shown in FIG. 5.

In the circuit of FIG. 15, the switch 80, as controlled by the current detector 82, connects the subscriber loop to either off-hook supply $S_1$ or on-hook supply $S_2$ depending on whether the loop current $I_L$ is greater or less than $I_2$. In contrast to the circuits of FIGS. 2 and 5, that of FIG. 15 cannot be designed to have a current-voltage characteristic in which the loop voltage is a single-valued function of the loop current, such as is shown in FIG. 3(c). Rather, in order to be stable at all values of $I_L$, including $I_2$, the characteristic must be designed with hysteresis, as is shown in FIG. 16. That is, there must be a finite region of $I_L$, from $I_2-\Delta I$ to $I_2+\Delta I$, where the loop voltage may assume one of the two values $V_1$ or $V_2$.

In the region of hysteresis between $I_2-\Delta I$ and $I_2+\Delta I$, the value assumed by the loop voltage depends upon its immediately previous history. When, for example, the switch is in the position shown, connecting the loop to on-hook supply $S_2$' the switch must remain in that position until $I_L$ reaches $I_2+\Delta I$ before operating to connect the loop to off-hook supply $S_1$. When in the latter position, the switch must remain in it until $I_L$ reaches $I_2-\Delta I$ before operating to assume the position shown.

The extent of the region of hysteresis (i.e. the value of ΔI) depends upon practical considerations regarding tolerances of the current detector. If under any conditions the switching thresholds should become reversed, the switch would oscillate between its two positions for values of loop current around $I_2$.

Thus, it is an advantage of the circuit of FIG. 5 that it is stable against oscillation without requiring hysteresis.

Another difference between the circuits of FIGS. 5 and 15 lies in the fact that, in the circuit of FIG. 5 on-hook supply $S_2$ provides power during both on- and off-hook conditions of the subscriber loop, but in the circuit of FIG. 15, the on-hook supply $S_2$ only operates when the loop is in an on-hook condition.

In all cases, it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. A power feed circuit for a telephone subscriber loop, the loop connected to a unit of terminal equipment, the unit of terminal equipment being switchable between an on-hook condition and an off-hook condition; the power feed circuit comprising:
    a first current supply circuit for supplying power to said subscriber loop when said unit of terminal equipment is in said on-hook condition and when said unit of terminal equipment is in said off-hook condition; and
    a second current supply circuit for supplying power to said subscriber loop only when said unit of terminal equipment is in said off-hook condition.

2. A power feed circuit according to claim 1, wherein said first current supply circuit includes a first battery and said second current supply circuit includes a second battery.

3. A power feed circuit according to claim 1, wherein said first and second current supply circuits are connected in parallel to said subscriber loop.

4. A power feed circuit according to claim 3, wherein said second current supply circuit is connected to said subscriber loop via a diode, and said diode is reverse-biased when said unit of terminal equipment is in said on-hook condition.

5. A power feed circuit according to claim 1, further comprising a first loop terminal and a second loop terminal, said first and second loop terminals for connecting said power feed circuit to said subscriber loop;
    wherein said first current supply circuit includes:
        a first battery having a positive terminal and a negative terminal, said positive terminal connected to said first loop terminal;
        a first transistor having a collector terminal, an emitter terminal and a base terminal;
        a diode connected between said second loop terminal of the power feed circuit and said collector terminal of said first transistor, with said diode having a polarity for conducting current only in the direction from said second loop terminal to said collector terminal;
        a first emitter resistor connected between said emitter terminal of said first transistor and said negative terminal of said first battery;
        a first bias resistor connected between said positive terminal of said first battery and said base terminal of said first transistor; and
        a second bias resistor connected between said negative terminal of said first battery and said base terminal of said first transistor;

and wherein said second current supply circuit includes:
        a second battery having a positive terminal and a negative terminal, said positive terminal of said second battery connected to said first loop terminal;
        a second transistor having a collector terminal, an emitter terminal and a base terminal, said collector terminal of said second transistor connected to said second loop terminal of the power feed circuit;
        a second emitter resistor connected between said emitter terminal of said second transistor and said negative terminal of said second battery;
        a third bias resistor connected between said positive terminal of said second battery and said base terminal of said second transistor; and
        a fourth bias resistor connected between said negative terminal of said second battery and said base terminal of said second transistor.

6. A power feed circuit according to claim 5, wherein said first battery has a nominal voltage rating of 12 V and said second battery has a nominal voltage rating of 24 V.

7. A power feed circuit for a telephone subscriber loop, the loop connected to a unit of terminal equipment, the unit of terminal equipment being switchable between an on-hook condition and an off-hook condition; the power feed circuit comprising:
    a first current supply means for supplying power to said subscriber loop when said unit of terminal equipment is in said on-hook condition and when said unit of terminal equipment is in said off-hook condition; and
    a second current supply means for supplying power to said subscriber loop only when said unit of terminal equipment is in said off-hook condition.

8. A power feed circuit according to claim 7, wherein said first current supply means includes a first battery and said second current supply circuit includes a second battery.

9. A power feed circuit according to claim 7, wherein said first and second current supply means are connected in parallel to said subscriber loop.

10. A power feed circuit according to claim 9, wherein said second current supply means is connected to said subscriber loop via a diode, and said diode is reverse-biased when said unit of terminal equipment is in said on-hook condition.

11. A power feed circuit according to claim 7, further comprising a first loop terminal and a second loop terminal, said first and second loop terminals for connecting said power feed circuit to said subscriber loop;
    wherein said first current supply means includes:
        a first battery having a position terminal and a negative terminal, said positive terminal connected to said first loop terminal;
        a first transistor having a collector terminal, an emitter terminal and a base terminal;
        a diode connected between said second loop terminal of the power feed circuit and said collector terminal of said first transistor, with said diode having a polarity for conducting current only in the direction from said second loop terminal to said collector terminal;
        a first emitter resistor connected between said emitter terminal of said first transistor and said negative terminal of said first battery;
        a first bias resistor connected between said positive terminal of said first battery and said base terminal of said first transistor; and a second bias resistor connected between said negative terminal of said first battery and said base terminal of said first transistor;

and wherein said second current supply means includes:

a second battery having a positive terminal and a negative terminal, said positive terminal of said second battery connected to said first loop terminal;

a second transistor having a collector terminal, an emitter terminal and a base terminal, said collector terminal of said second transistor connected to said second loop terminal of the power feed circuit;

a second emitter resistor connected between said emitter terminal of said second transistor and said negative terminal of said second battery;

a third bias resistor connected between said positive terminal of said second battery and said base terminal of said second transistor; and a fourth bias resistor connected between said negative terminal of said second battery and said base terminal of said second transistor.

12. A power feed circuit according to claim 11, wherein said first battery has a nominal voltage rating of 12 V and said second battery has a nominal voltage rating of 24 V.

13. A method of feeding power to a telephone subscriber loop, the loop connected to a unit of terminal equipment, the terminal equipment being switchable between an on-hook condition and an off-hook condition; the method comprising:

supplying power to said subscriber loop with a first current supply circuit when said unit of terminal equipment is in an on-hook condition and when said unit of terminal equipment is in said off-hook condition; and supplying power to said subscriber loop with a second current supply circuit only when said unit of terminal equipment is in said off-hook condition.

* * * * *

UNITED STATES PATENT AND TRADEMARK OFFICE
CERTIFICATE OF CORRECTION

PATENT NO.    : 6,157,716
DATED         : December 5, 2000
INVENTOR(S)   : Ortel, William C.G.

It is certified that error appears in the above-identified patent and that said Letters Patent is hereby corrected as shown below:

Column 7,
Line 44, delete "$I_{12}R_{12}=V_{BE}+(I_{c2}+I_{B2})R_{E2}$" and insert
-- $I_{12}R_{12}=V_{BE2}+(I_{c2}+I_{B2})R_{E2}$ --.
Line 55, delete "$R_{12} \dfrac{R_{22}}{(R_{12}+R_{22})}$" and insert -- $\dfrac{R_{12}R_{22}}{(R_{12}+R_{22})}$ --.

Column 9,
Line 17, delete "$V_{c2}=E_2-(_{B2}+I_{c2})R_{E2}-V_{CE2}(I_{B2})$" and insert
-- $V_{c2}=E_2-(I_{B2}+I_{c2})R_{E2}-V_{CE2}(I_{B2})$ --.

Column 13,
Line 41, delete "$V_L+_{VD}$" and insert -- $V_L+V_D$ --.

Column 16,
Line 63, delete "$S_1$'" and insert -- $S_2$ --.

Signed and Sealed this

Sixth Day of August, 2002

Attest:

JAMES E. ROGAN
*Attesting Officer*     *Director of the United States Patent and Trademark Office*